Patented Feb. 7, 1928.

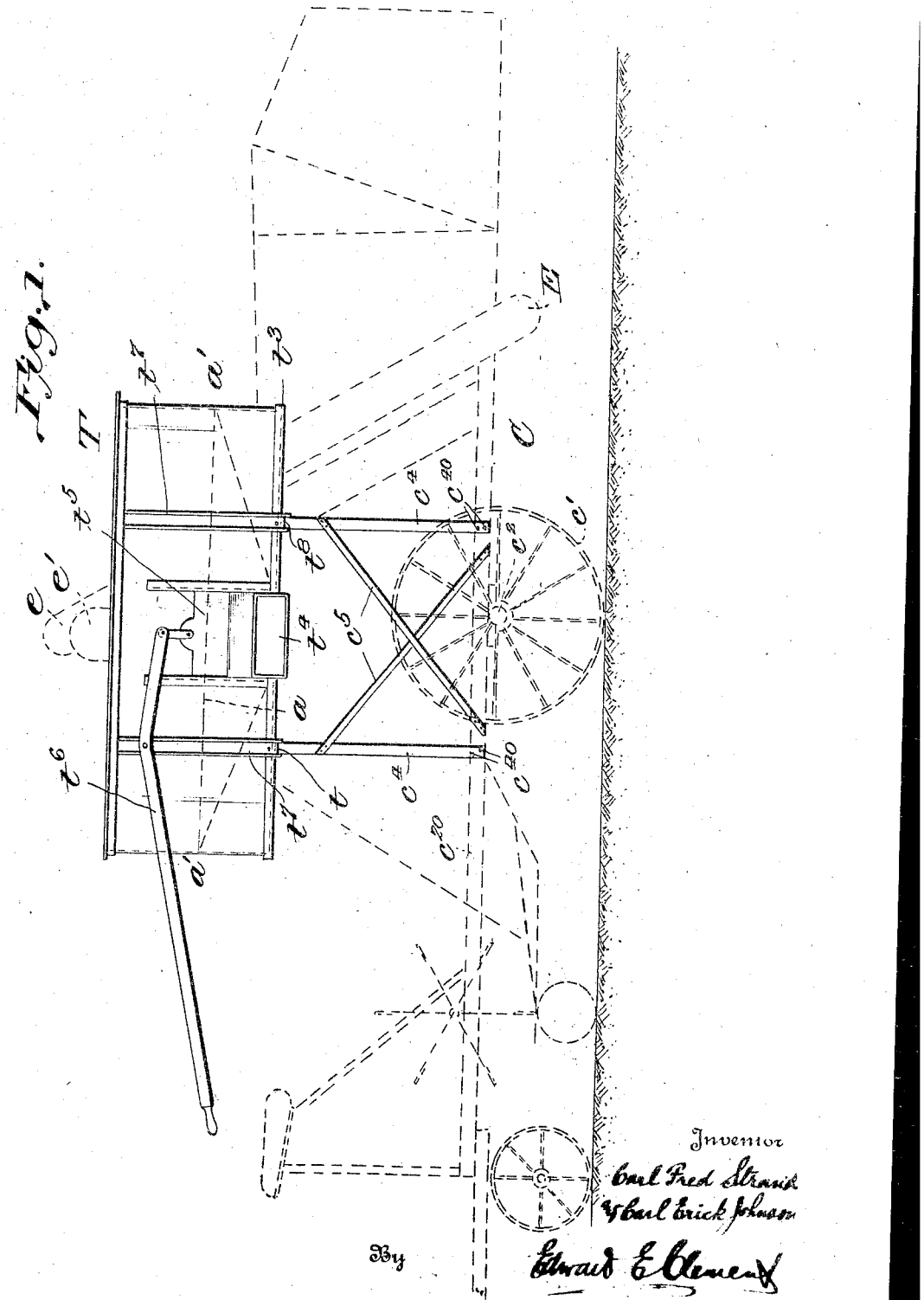

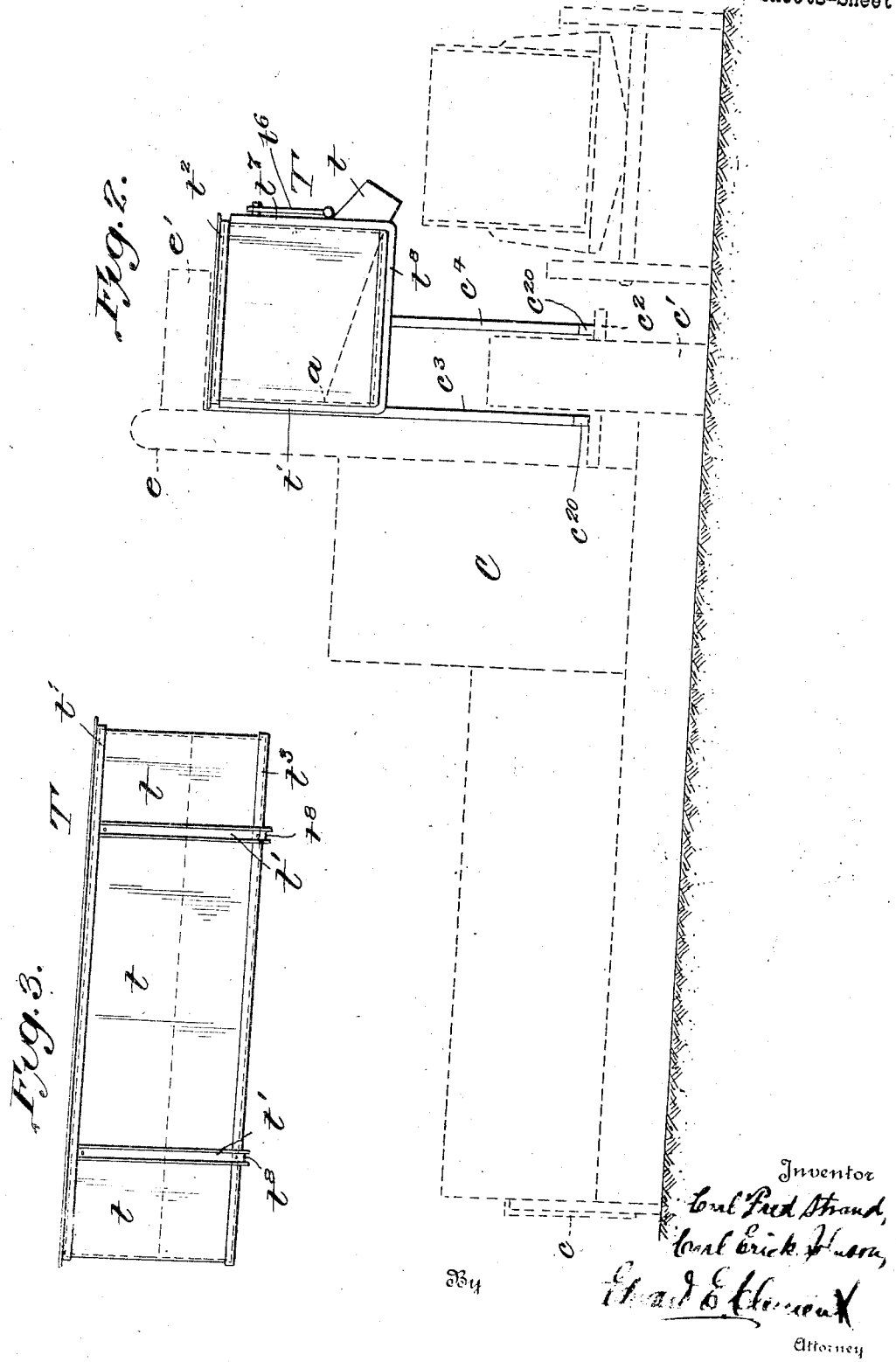

1,658,614

UNITED STATES PATENT OFFICE.

CARL FRED STRAND AND CARL ERICK JOHNSON, OF HUTCHINSON, KANSAS, ASSIGNORS OF ONE-THIRD TO ALBIN BENSON, OF HUTCHINSON, KANSAS.

TANK FOR COMBINED HARVESTERS AND THRASHERS.

Application filed March 21, 1922. Serial No. 545,616.

Our invention relates to agricultural machines, and has for its objects the provision of means to increase the efficiency of operation of combined harvesters and thrashers.

We attain our objects by providing a storage receptacle and fixing the same in balanced position on the side of the machine directly over the bull wheel, in a manner to be presently described. This tank receives the grain from the delivery head or chute of a conveyer or elevator of usual type, and is arranged so that it may store the grain without unbalancing the machine until a wagonload is ready and may then be operated from the driver's seat on the vehicle to discharge the grain into a wagon without throwing the machine out of balance.

Our invention is illustrated in the accompanying drawings, in which:

Figure 1 is a side view of a machine with parts shown in dotted lines, our attachment being shown in full lines.

Figure 2 is a front elevation of the same.

Figure 3 is a side view of the receptacle showing stiffening and securing means.

Referring to the drawings, C indicates generally a combined harvester and thrasher of known type, having a frame $c^{20}$ supported on wheels of which one as usual is the bull wheel $c^1$ journalled on axle $c^2$. This bull wheel represents the main supporting and power factor in the machine and we connect our attachment to it in such manner as to balance the load and make the same easy to carry. The attachment comprises a tank T having sides and bottom of galvanized iron sheets, $t$, with an angle iron stiffening band $t^2$ around the top, a similar band around the bottom, stiff iron members such as channels across the bottom at $t^5$, and side irons of similar character, $t^1$ and $t^7$. The tank is supported on struts $c^3$—$c^6$ bolted at $c^{10}$ to the frame members $c^{20}$ on both sides of the bull wheel $c^1$, the upper ends of the struts being bolted or riveted to the tank frame members $t^5$ and $t^1$, the struts $c^8$ being also bolted or riveted to the frame of the machine inside the bull wheel. Longitudinal racking is prevented by diagonal braces $c^5$.

The receptacle is thus supported beneath the discharge head $e$ and chutes $e^1$ of the conveyer or conveyors E, which are modified to this extent, that the chute $e^1$ discharges into the tank T instead of over the side as at present. To discharge the tank a spout $t^4$ is provided having a gate $t^5$, controlled by lever $t^6$ from the driver's seat of the machine. The bottom of this spout lies in the same plane as the sloping bottom of the tank, which extends continuously upward from the lower lip of the spout $t^4$ to the back of the tank at $a$, also to both ends at $a^1$—$a^1$. The result of this is that the tank is self discharging without tilting, which would be impossible with any form of chute or intermediate carrier now in use, to our knowledge. The importance of this construction is due to the limited amount of space available and the necessity for maintaining the load balanced over the bull wheel. A tipping hopper is impossible, as it would either make the machinery top heavy or throw it out of balance beside interrupting the operation while discharging the hopper.

It is to be particularly noted that our device is not a trough or spout, or conveyer member, but a storage tank or receptacle into which grain shall be run from and through the trough, for the purpose of conveying the grain and holding the same until it is accumulated in large enough quantities to load a wagon. The modern combination machines have a trough or spout at the top or at the top of the elevator head, long enough to load the grain to the wagon, but no storage capacity. In our machine we provide this storage capacity in our tank which, beside being directly over the bull wheel, is against the side of the machine, fitting closely against it so it can have sufficient carrying capacity to be of value, and we fasten our tank so as to be stationary, without either intent or danger of tipping, whereby balance is maintained and the machine can be operated while the tank or bin is being discharged into a wagon.

It is to be understood that some changes in details may be made without departing from our invention, and we contemplate all such changes as fall fairly within the scope of the appended claims:

What we claim is:

1. A combined grain harvester and separator, including a framework elevator and bull wheel, in combination, a grain tank arranged beneath the outlet of said elevator and supported vertically above the bull wheel by frame elements supported on the machine frame inside and outside said bull wheel, said tank being balanced with respect to the bull wheel by having its center of gravity within the outer bearing thereof, a gate normally closed arranged in the outer wall of said tank, a floor for said tank, sloping downwardly from the ends and back towards said gate, and means for projecting grain from said tank beyond the outer face of the bull wheel when said gate is opened.

2. The combination claimed in claim 1, in which the tank is extended lengthwise along the frame, above the bull wheel in order to reduce its width without reducing its content, and is provided with a floor sloping from both ends toward the gate, whereby it is possible to produce balancing by keeping the center of gravity over the bull wheel structure.

3. In combination with a combined grain harvester and separator including a framework, elevator and bull wheel; a grain tank arranged beneath the outlet of said elevator and supported above the bull wheel by frame elements; a downwardly and outwardly sloping floor for said tank, and a gate, normally closed, arranged in the outer wall of said tank in a plane parallel to but beyond the plane of the outer face of the bull wheel.

4. A combined grain harvester and thrasher having a grain storage tank of wagonload capacity receiving the thrashed grain and adapted to alternately accumulate and discharge in wagonloads, provided with an elevated discharge for the thrashed grain located at the side of the combined harvester and thrasher at a sufficient elevation to load a wagon or truck located at the side of the combined harvester and thrasher, and means for controlling the discharge of grain from the tank.

5. In combination with a combined grain harvester and separator, including a framework, elevator and bull wheel, a grain storage tank of wagonload capacity arranged beneath the outlet of said elevator and supported above the bull wheel by frame elements, said storage tank alternately accumulating and discharging the thrashed grain in wagon loads, and provided with an elevated discharge for the thrashed grain located at the side of the combined harvester and thrasher at sufficient elevation to load the wagon or truck, and means for controlling the discharge of grain from the storage tank.

In testimony whereof we hereunto affix our signatures.

CARL FRED STRAND.
CARL ERICK JOHNSON.